(12) United States Patent
Chen

(10) Patent No.: US 7,066,627 B1
(45) Date of Patent: Jun. 27, 2006

(54) LASER LIGHT BEAM GUIDING DEVICE ON A STONE CUTTER

(76) Inventor: Yueh-Ting Chen, P.O. Box 697, Fongyuan City, Taichung County (TW) 420

(*) Notice: Subject to any disclaimer, the term of this patent is extended or adjusted under 35 U.S.C. 154(b) by 34 days.

(21) Appl. No.: 11/004,922

(22) Filed: Dec. 7, 2004

(51) Int. Cl.
*G02B 27/20* (2006.01)

(52) U.S. Cl. ............................ 362/259; 362/89; 83/520
(58) Field of Classification Search .................. 362/89, 362/119, 191, 253, 259; 83/520, 521
See application file for complete search history.

(56) References Cited

U.S. PATENT DOCUMENTS

| 6,976,764 B1 * | 12/2005 | Cheng et al. ................ 362/89 |
| 6,988,439 B1 * | 1/2006 | Liu et al. ...................... 362/89 |
| 2004/0261592 A1 * | 12/2004 | Chen ......................... 362/119 |

* cited by examiner

*Primary Examiner*—Stephen F Husar

(57) ABSTRACT

A laser light beam guiding device on a stone cutter includes a tubular main body pivoted to a lug of a seat which is secured to a front top of a blade guard of the stone cutter, a battery chamber in the main body controlled by a switch button on the top, a tubular sleeve on the rear portion of the main body and a laser projector rotatably engaged with the front end of the main body to emit the light beam on a working piece to decide a cutting line for the saw blade to follow up.

1 Claim, 6 Drawing Sheets

LASER LIGHT BEAM GUIDING DEVICE ON A STONE CUTTER

BACKGROUND OF THE INVENTION

The present invention relates to stone cutters and more particularly to a laser light beam guiding device on a stone cutter which utilizes the laser light flux to calibrate a cutting line for the saw blade to follow to implement a precise cutting activity.

As we know that a stone cutter being cutting a tile has to previously decide a precise cutting line for the tile on the sliding leaf of a stone cutter for the saw blade to flow. Nodaway, most of the operator uses a ruler to measure a culling line on the tile before the saw blade begins to cutting. This old method has been proved too rough and wasting a lot of time and labor. Besides, the result is not so accurate as expected so as to cause a great lost.

SUMMARY OF THE PRESENT INVENTION

The present invention has a main object to provide a laser light beam guiding device on a stone cutter which utilizes the laser light beam projecting on the surface of a working piece for facilitating the saw blade to follow to implement a precise and rapid cutting activity.

Another object of the present invention is to provide a laser light beam which is adjustable to find out an exact cutting line on the surface of the working piece.

Accordingly, the laser light beam guiding device on a stone cutter of the present invention comprises generally a laser light beam device secured on the top of the blade guard of a conventional stone cutter.

The laser light beam guiding device has a tubular main body, a battery chamber in the body, a laser projector at the front end, a tubular sleeve on the rear end, a switch button on a top and a pair of perforated fin plates pivoted to a lug of an oblong seat which is secured to the blade guard of the stone cutter. So that the laser light beam device is able to turn vertically and laterally to quickly fine out an exact cutting line on the working piece for the saw blade to follow up.

The present invention will become more fully understood by reference to the following detailed description thereof when read in conjunction with the attached drawings.

DETAILED DESCRIPTION OF THE PREFERRED EMBODIMENT

Figure 1:
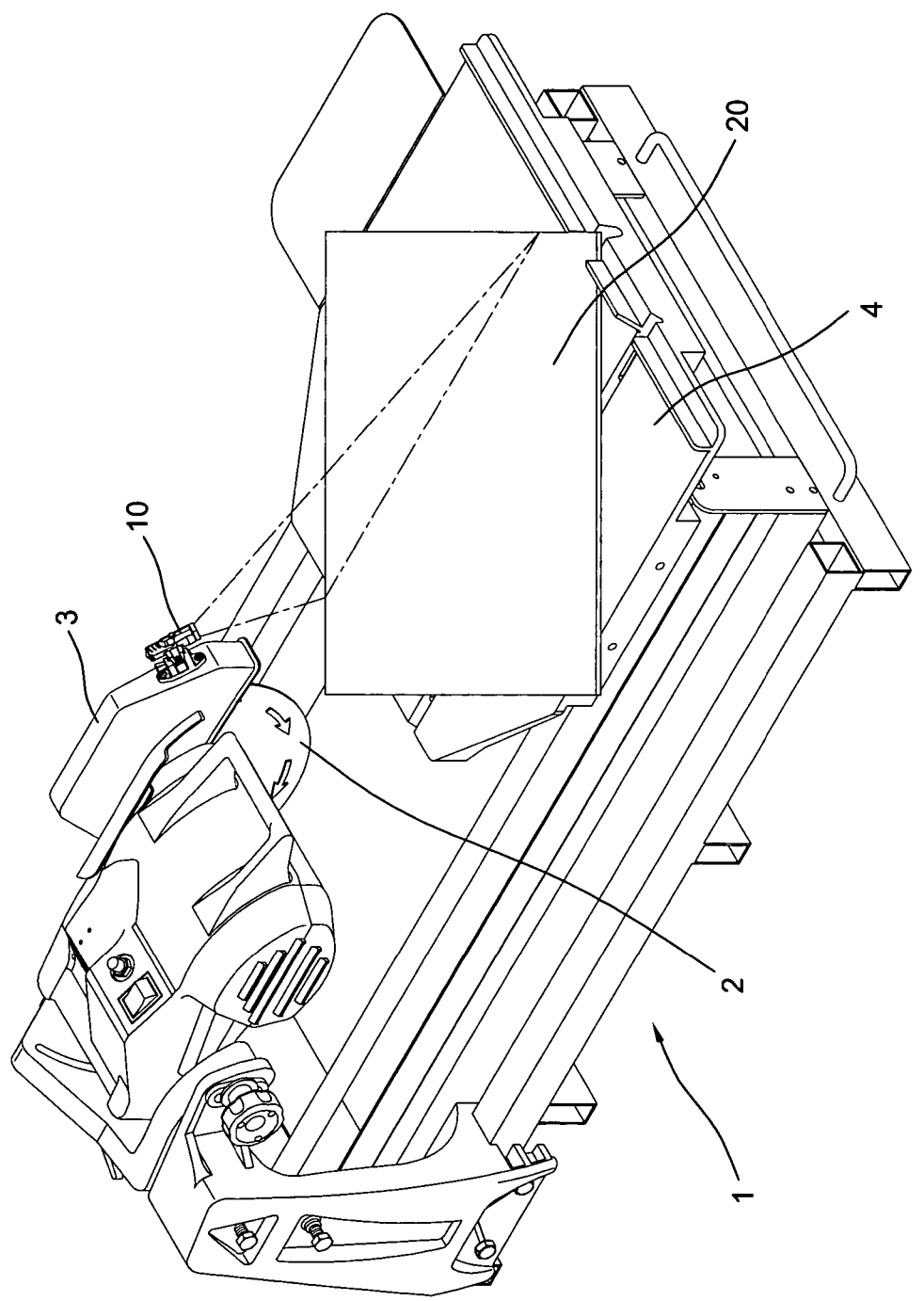
FIG. 1 is a perspective view to show a laser light beam device on a top of the blade guard of a conventional stone cutter.
Figure 2:
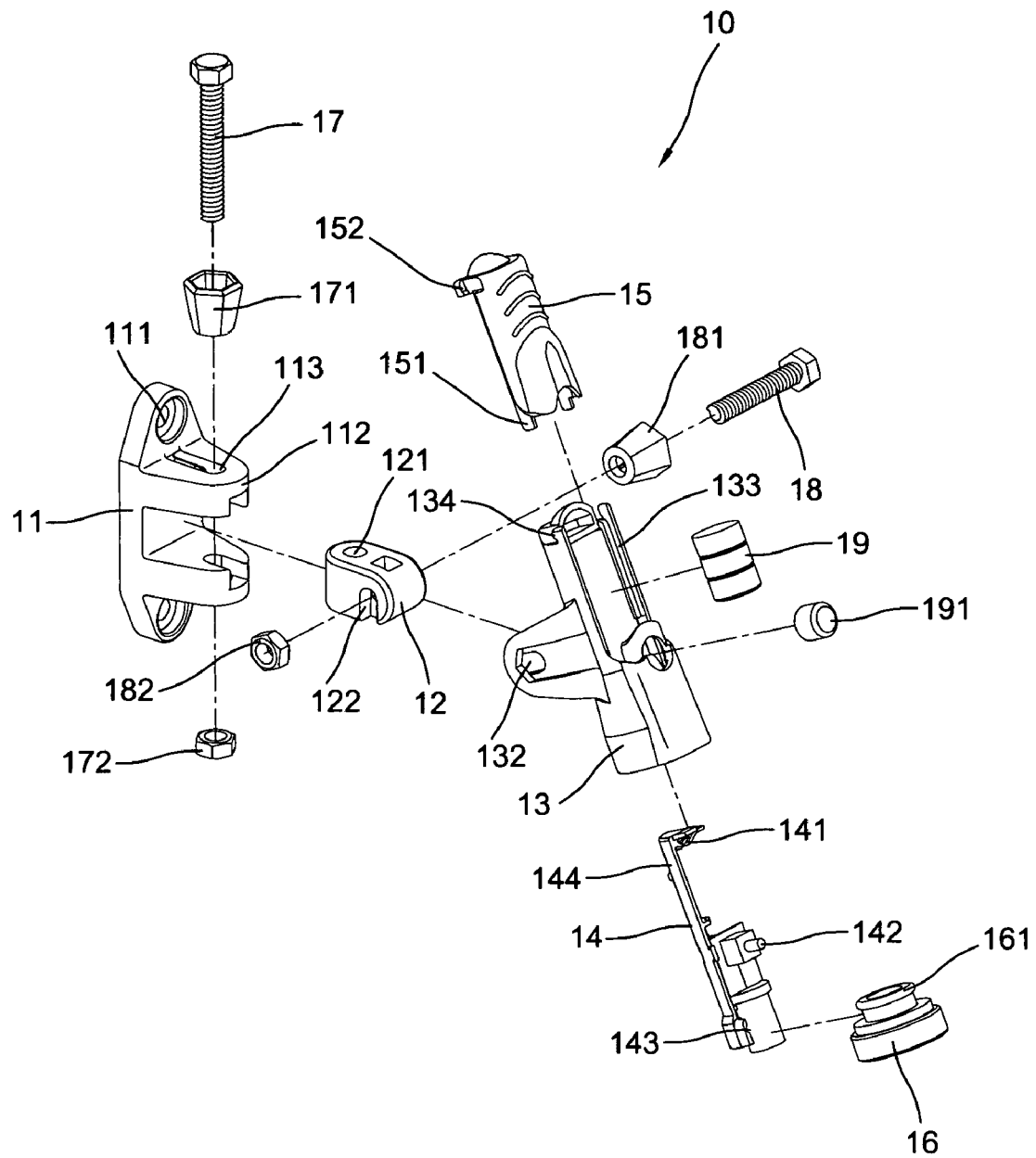
FIG. 2 is an exploded perspective view to show the preferred embodiment of the laser light beam device according to the present invention.

With reference to the drawings and initiated from FIGS. 1 to 4, the laser light beam guiding device on a stone cutter of the present invention comprises a laser light beam guiding device 10 secured on a front top of the guard 3 of a saw blade 2 of a stone cutter 1 which includes a slidable platform 4 with a working piece 20 on the platform 4.

Figure 3:
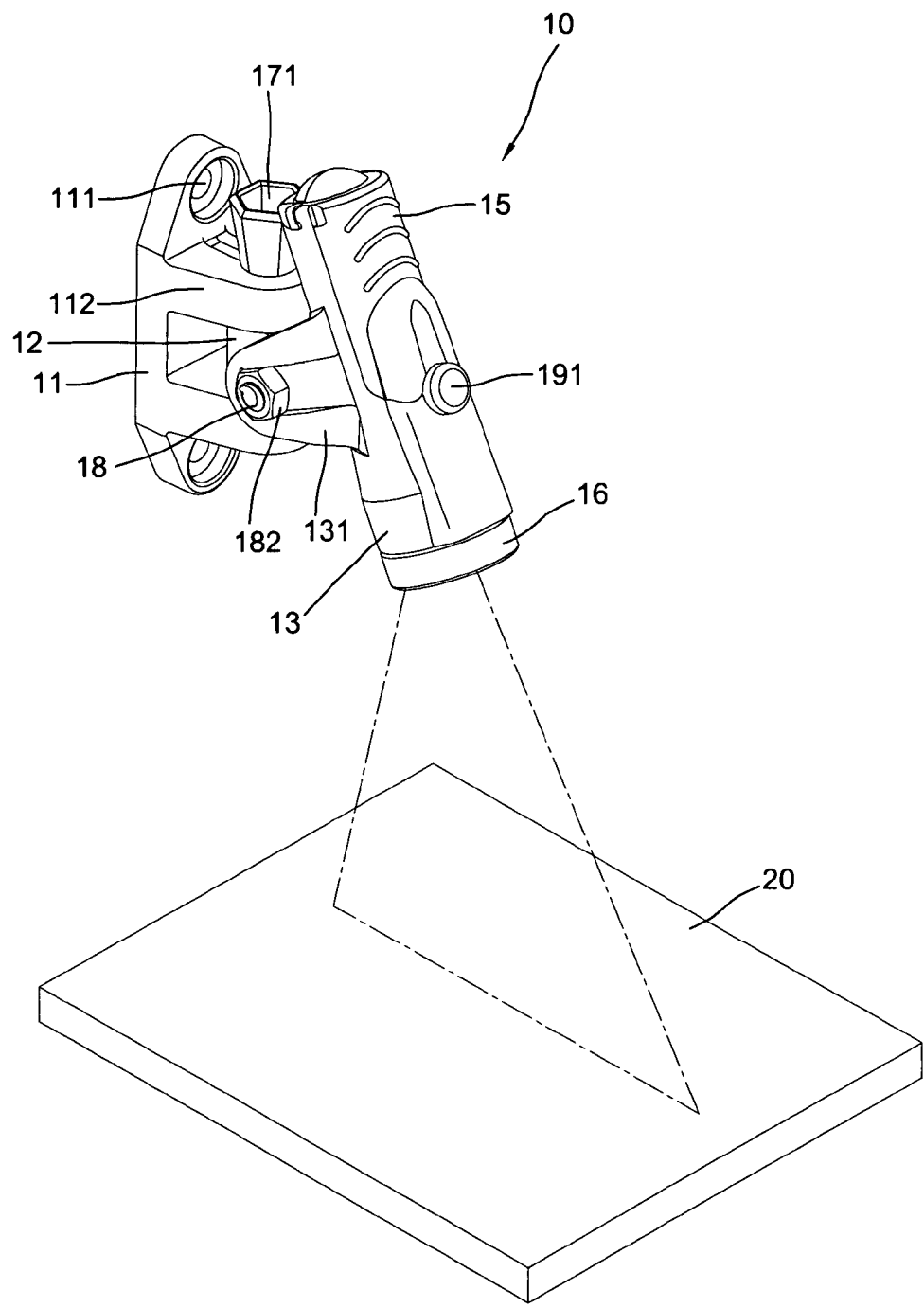
FIG. 3 is a perspective view to show the assembly of FIG. 2.
Figure 4:
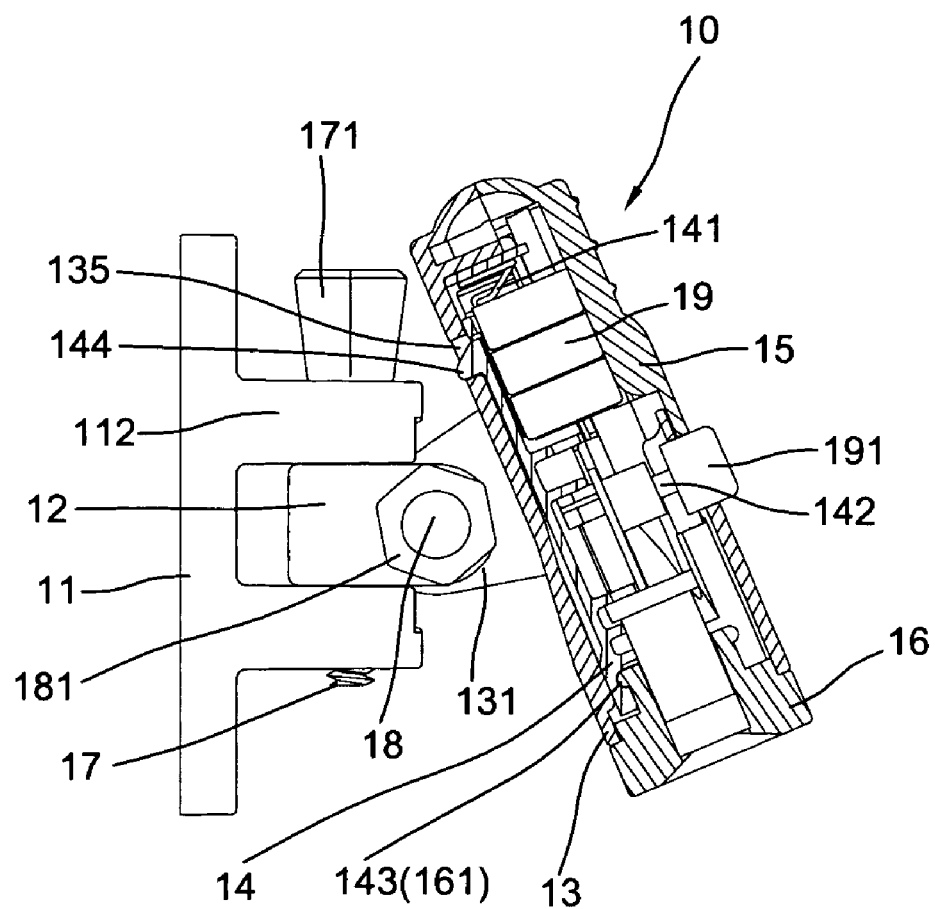
FIG. 4 is a sectional view to FIG. 3.
Figure 5:
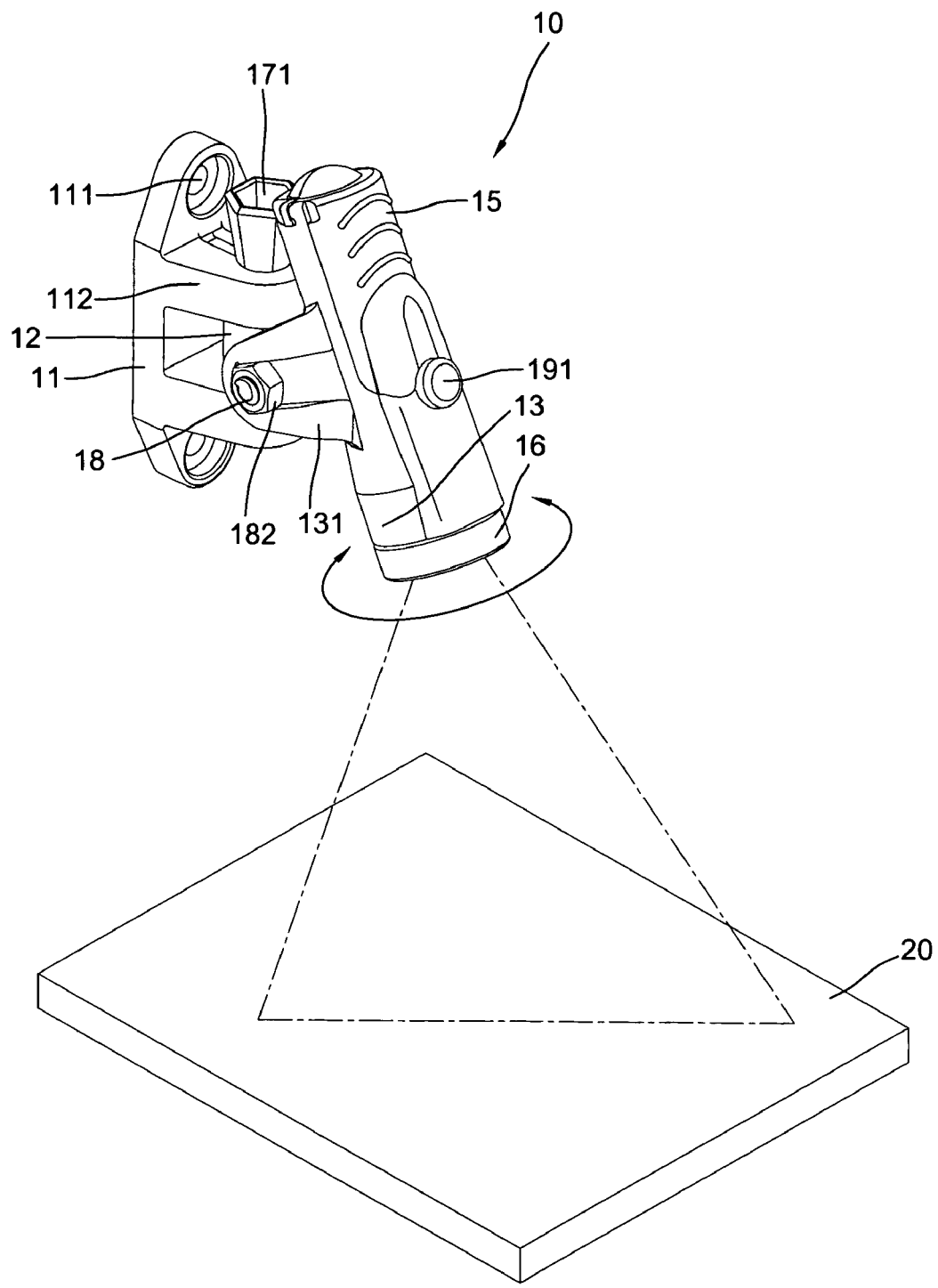
FIG. 5 is a perspective view to show that the laser projector is rotatable to emit the light beam on the surface of a working piece.

The laser light beam guiding device 10 comprises an oblong seat 11 having a pair of through holes 111 respectively formed in two end for securing the seat 11 to a front top of the guard 3 by screws, a lug 112 projected outward from the center of one side having an oblong through hole 113 in a lateral side and a pair of concaves symmetrically formed in inner side for engaging within a pivot block 12 which has a vertical through hole 121 engaged with the oblong through hole 113 of the lug 112 and rotataly secured by a bolt 17 and a pair of nut 171 and 172 and a horizontal slot 122 in a bottom, a tubular main body 13 including a pair of fin plates 131 respectively projected downward from the opposing outer peripheries each having a through hole 132 adjacent free end engaged with the horizontal slot 122 of the pivot block 12 and rotatably secured by a bolt 18 and a pair of nuts 181 and 182, a battery chamber 14 inserted into the main body 13 having conductive plate 141 on rear end, a switch rod 142 on a top protruded outward via a through hole in the top of the main body 13, a positioning ring 143 at front end and a hook 144 on an underside, a battery 19 disposed in the battery chamber 14, a button 191 connected to the switch rod 142, a tubular sleeve 15 sleeved on the rear end of the main body 13 having a pair of sliding plates 151 on front end engaged the a pair of guides 133 in the opposing sides of the main body 13 and a pair of projections 152 on the opposing peripheries engaged within a pair of coupling slot 134 of the main body 13 and a laser projector 16 having a coupling ring 161 on rear end rotatably engaged with the positioning ring 143 of the battery chamber 14. The main body 13 further has a retaining slot 135 in the bottom engaged with the hook 144 of the battery chamber 14. FIGS. 3 and 4 show the assembly of the laser light beam guiding device 10. FIG. 5 shows that the laser projector 16 is rotatable leftward and/or rightward to adjust the correct position of the light beam projected on the surface of a working piece 20 in order to satisfy the operator.

Figure 6:
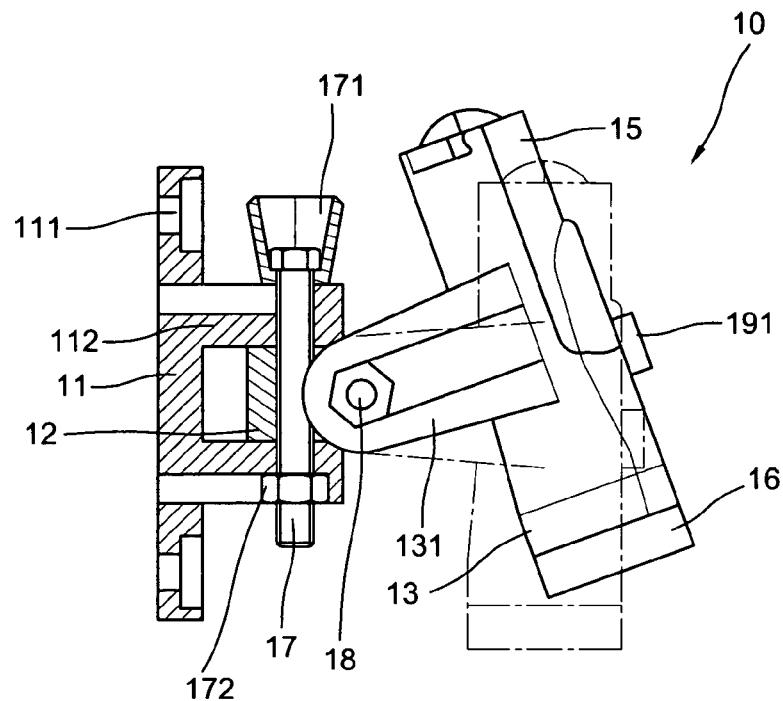
FIG. 6 is a side view to show that the laser light beam device is turned vertically.
Figure 7:
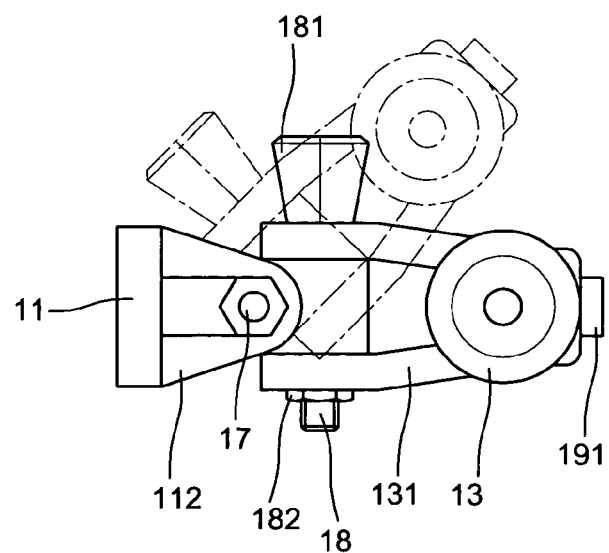
FIG. 7 is a front view to show that the laser light beam device is turned laterally.

FIGS. 6 and 7 indicate that the laser light beam guiding device 10 is vertically and laterally adjustable. Nevertheless, the light beam is always uniform with the moving direction of the saw blade 2. In the operation, put one of the working piece such as a tile 20 on the top of the slidable platform 4, and press down the switch button 191, the laser projector immediately emits the light beam on the surface of the working piece 20. While the operator may adjust the laser light beam guiding device 10 to quickly to find out a desired cutting line for the saw blade to follow up. So that the result must be more accurate and saves time and labor in comparison with the old method that uses a ruler to measure the cutting line.

The laser light beam guiding device 10 of the present invention is capable of assembling on to any stone cutter. Once the light beam is calibrated in uniform with the cutting direction of the saw blade, the cutting result should be relatively perfect. Further, the laser light beam guiding device 10 can be turned vertically and/or laterally during the calibration process. Especially the rotatable light projector 16 can march with the calibration process so that this process must be more convenient and rapid in order to promote the efficiency of the cutting undertakings.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. A laser light beam guiding device on a stone cutter comprising:
    a oblong seat having a pair of first through holes respectively formed adjacent two ends for securing said seat to a front top of a blade guard of a stone cutter which having saw blade and a sliding platform on top, a lug projected outward from a center of one side of said seat having an oblong through hole in a lateral side and a pair of concaves formed in opposing inner surfaces for movably disposing a pivot block therein which includes a vertical through hole engaged with the oblong through hole of said lug and rotatably secured by a first bolt and a pair of first nuts, a horizontal slot in a bottom thereof;
    a tubular main body having a pair of fin plates respectively projected downward from opposing peripheries each including a second through hole adjacent free end engaged with the horizontal slot of said pivot block and rotatably secured by a second bolt and pair of second nuts, a pair of coupling guides in opposing top of rear periphery, a pair of coupling slots in opposing side of rear end, a retaining recess in an underside and a third through hole in a top;
    a battery chamber inserted into said main body having a conductive plate on rear end, a switch rod on a top protruded out of said main body via the third through hole and engaged with a button thereon, a positioning ring at front end and a hook on an underside engaged within the retaining recess of said main body;
    a battery disposed into the battery chamber of said main body;
    a tubular sleeve sleeved onto rear portion of said main body having a pair of sliding plates on front end engaged with the pair of guides of said main body and a pair of projections on opposing peripheries engaged within the coupling slot of said main body;
    a laser projector having a coupling ring on rear end rotatably engaged with the positioning ring of said battery chamber;
    whereby, press the switch button, said laser projector will emit light beam on a working piece to accurately deciding a cutting line for said saw blade to follow up.

* * * * *